United States Patent Office

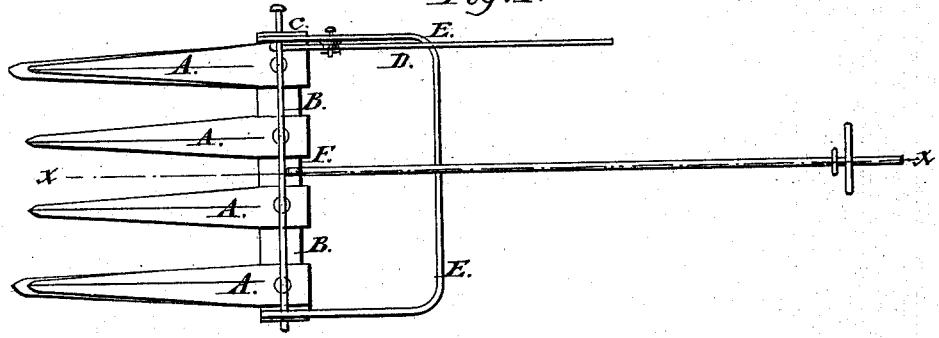
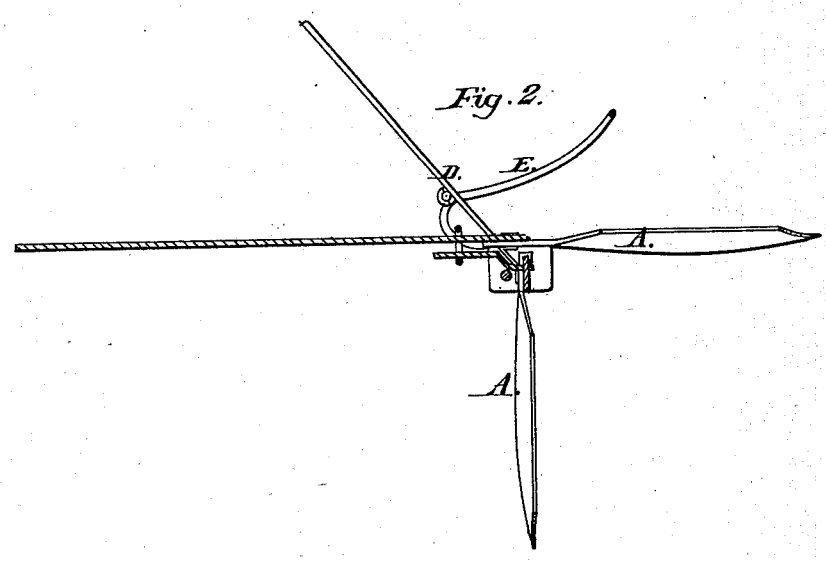

W. H. MILLER, OF BRANDENBURG, KENTUCKY.

Letters Patent No. 69,011, dated September 17, 1867.

COMBINED RAKE AND SPADE.

The Schedule referred to in these Letters Patent and making part of the same.

TO ALL WHOM IT MAY CONCERN:

Be it known that I, W. H. MILLER, of Brandenburg, Meade county, Kentucky, have invented a new and useful Improvement in a "Combined Rake and Spade;" and I do hereby declare that the following is a full, clear, and exact description thereof, which will enable others skilled in the art to make and use the same, reference being had to the accompanying drawings, forming part of this specification.

The present invention relates to a combined rake and spade, more particularly embraced in an application for Letters Patent made by me, and now on file in the United States Patent Office; and this invention consists principally in a novel attachment of the handle for operating the tines constituting the rake, to throw them into position for use as a rake or as a spade; and also in a triangular-shaped tine in cross-section. In the accompanying plate of drawings my improved combined rake and spade is illustrated—

Figure 1 being a plan or top view of the same, with the parts in position for use as a spade, and Figure 2 a section taken in the plane of the line $x\,x$, fig. 1, and with the tines in position for use as a rake.

A, in the drawings, represents the tines of the rake, secured by riveting to a common cross-bar, B, that is hung so as to swing or turn in a frame, C, of suitable construction therefor, and as in the application hereinbefore referred to. D the handle-lever for operating the rake-tines, which handle is secured to the cross-frame E for such tines, in addition to the cross-rod F, the centre upon which the said frame turns, as in the case of my former invention. The tines A are made of a triangular shape in cross-section, which gives a more perfect and better operation to them when used.

Having thus described my invention, what I claim as new, and desire to secure by Letters Patent, is—

1. The handle, fastened to frame E, carrying tines, substantially as described.
2. I also claim the triangular tines A in cross-section, substantially as and for the purpose specified.

The above specification of my invention signed by me this 5th day of February, 1867.

W. H. MILLER.

Witnesses:
    A. S. RANKIN,
    J. S. FAIRLEIGH.